Aug. 10, 1965 G. BADALINI 3,199,378
CONTINUOUS HYDRAULIC SPEED CHANGE GEAR WITH TWO SPEED RANGES
HAVING DIFFERENT AMPLITUDES FOR VEHICLES
Filed May 7, 1962 4 Sheets-Sheet 1

Giovanni Badalini
INVENTOR.

BY Wendworth, Lind
and Ponack, attorneys

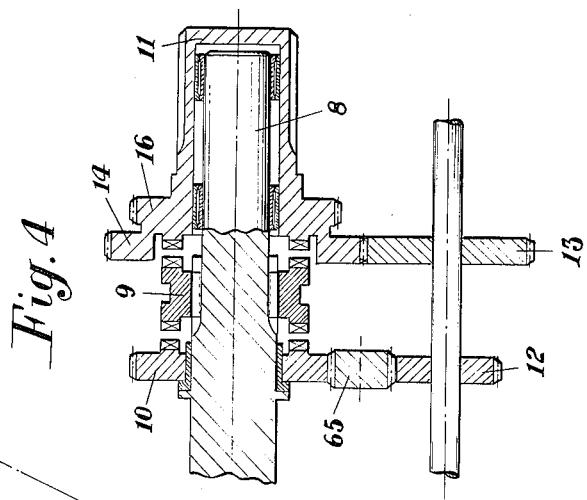
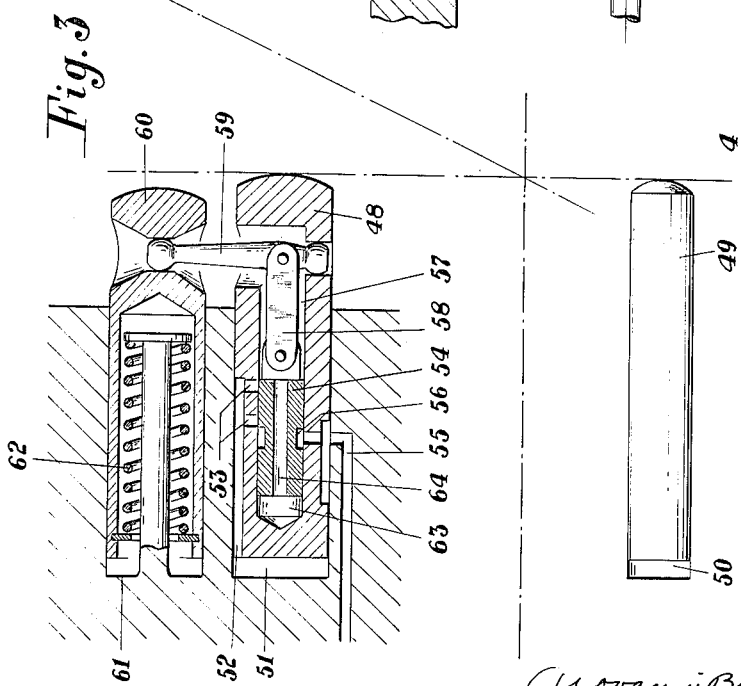

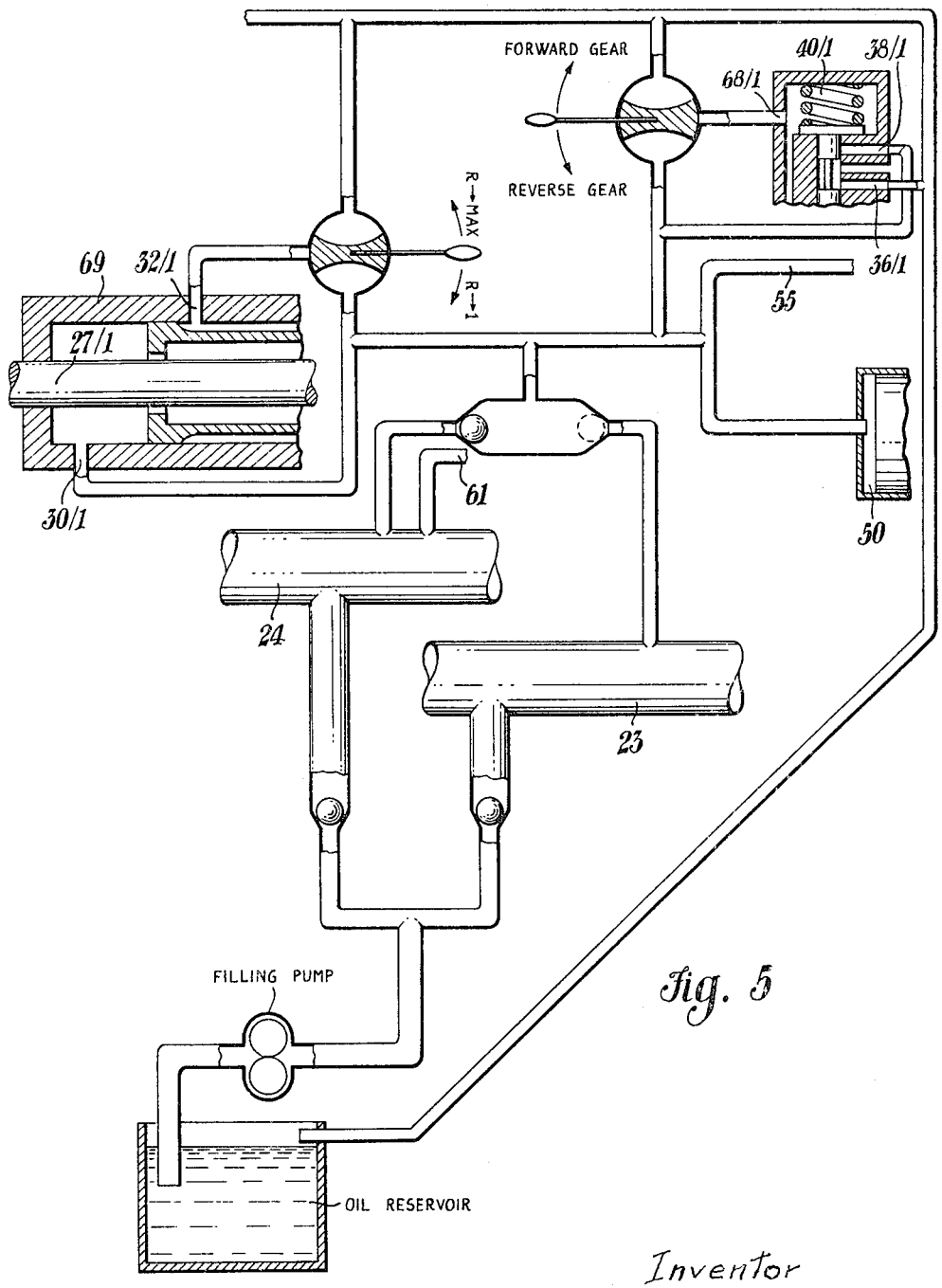

United States Patent Office 3,199,378
Patented Aug. 10, 1965

3,199,378
CONTINUOUS HYDRAULIC SPEED CHANGE
GEAR WITH TWO SPEED RANGES HAVING
DIFFERENT AMPLITUDES FOR VEHICLES
Giovanni Badalini, Rome, Italy, assignor to S.p.A. Cambi Idraulici Badalini, Rome, Italy
Filed May 7, 1962, Ser. No. 192,928
Claims priority, application Italy, June 9, 1961, 10,395/61
3 Claims. (Cl. 74—732)

The present invention relates to a device allowing the continuous change of the drive ratio between the driving shaft and the driven shaft with two ranges of speed, the feature of which being that one of said two ranges is obtained by a variable speed hydraulic drive and a mechanical direct drive while the other range is obtained by a variable speed hydraulic drive and a change speed gear.

The two speed ranges start from an almost equal minimum speed and reach a remarkably different value. The difference between the maximum limits of the two ranges is of the order of the mechanical ratio inserted into the second range. This second speed range has an efficiency which is complementary to the efficiency of the first range, in that said second range has a high efficiency in the zone where the first range has its lowest efficiency; this feature will be particularly advantageous where the vehicle must run for a long time at low speeds.

The above disclosed object is attained by means of a device consisting of a pump having its inner members fixed to the input driving shaft while the outer casing of the pump rotates on supports. This rotary casing has the capability of being connected either directly or through a gear unit to the driven shaft of the speed change gear.

The hydraulic device is completed by one or more hydraulic motors hydraulically connected in closed circuit to the pump, and mechanically connected to the driven shaft by means of gears always in mesh.

Said pump and said hydraulic motors can be of the piston type, where the pistons are controlled by a swash plate to allow the respective displacement to be changed at will.

The hydraulic motors can be geared with respect to the driven shaft so as to obtain with motors having a reduced displacement, the desired increase of torque. For economy of construction, in mass production they can be also formed by elements identical those of the pump. Also the number thereof could be increased in order to obtain the desired total displacement.

When the hydraulic motors are in a number greater than one, the control of the change of displacement thereof will be carried out by means of jacks which automatically will operate the plates after one another instead of simultaneously, in order to improve the efficiency of the drive.

Further, a special valve automatically shuts off the pressure to the motors as they reach the zero displacement, obtaining thus a further increase of efficiency. Obviously, the same valve automatically places the motors again under pressure when a certain displacement is given to said motors.

In order to have the vehicle running at a speed lower than that allowed by the ratio corresponding to the maximum displacement of the pump and of the hydraulic motors, the reduction of the displacement of the pump will be obtained by reducing the tilting of the swash plate of said pump.

The control of said tilting is obtained by hydraulic means, as said control must be actuated inside the rotary casing containing the pump. A hydraulic repeater will be controlled from outside by changing the pressure of the filling pump of the speed change gear circuit which serves the purpose of removing the air from the ducts, sending thereinto low pressure oil and allowing the return stroke of the pistons thereby dispensing with the use of springs or other mechanical systems.

Said repeater will be able to diminish the tilting of the pump plate when the vehicle runs with the main engine in tractive conditions, avoiding thus a braking action on the vehicle by the main engine through the speed change gear which will occur at nonreversable ratios of said speed change gear.

If for the particular vehicle, the two ranges of forward speed are not desired, the second range of ratios could be utilized to obtain the run in both directions.

One preferred embodiment of the device is shown in the attached drawings wherein:

FIGURE 3 is a cross-sectional view of the differential control for the swash plate of the pump.

FIGURE 4 represents diagrammatically an alternative embodiment of the output drive from the speed change gear.

FIGURE 5 is a diagrammatic view showing the cooperation between the various elements.

Figure 1:
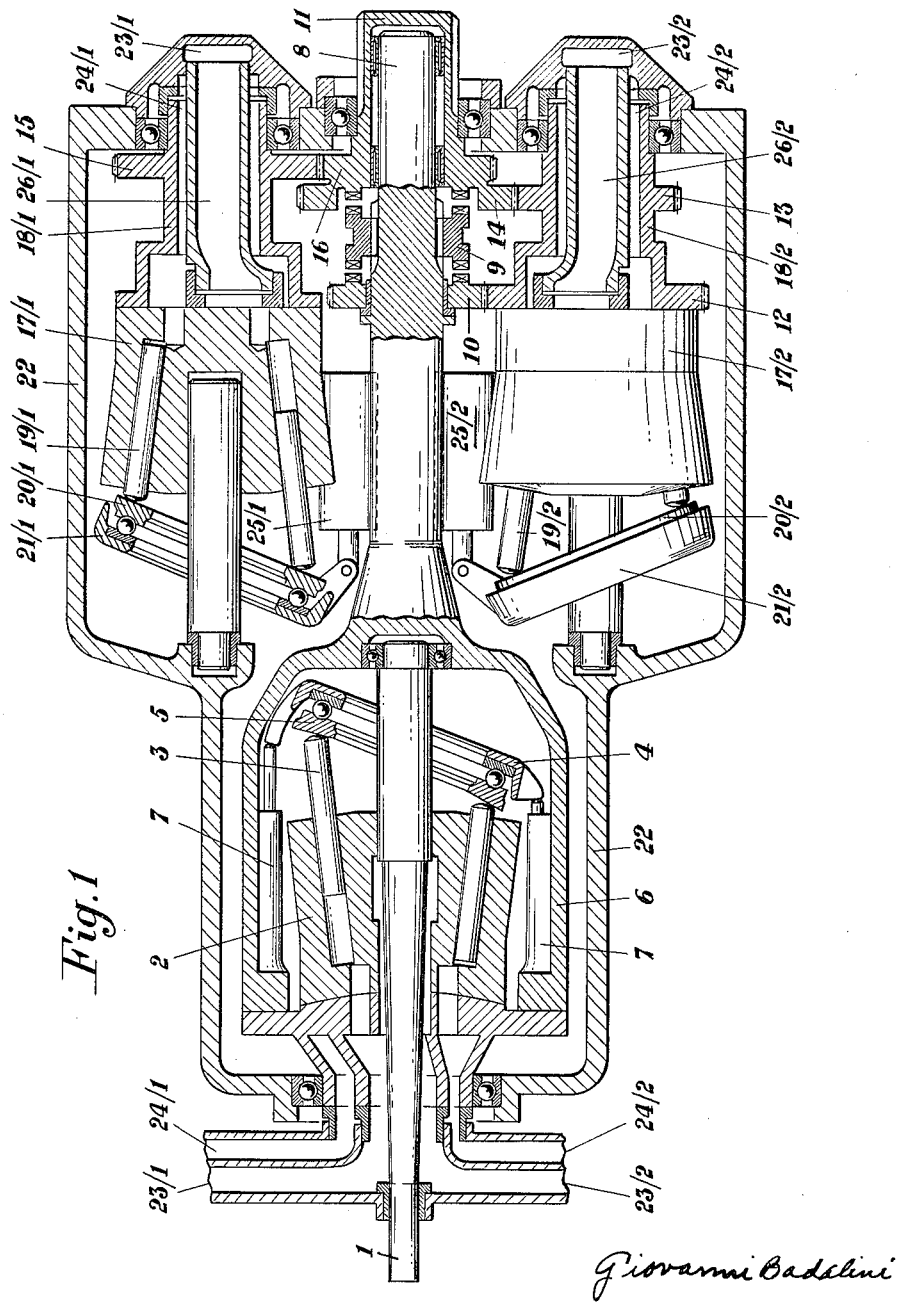
FIGURE 1 shows a longitudinal cross-sectional top view of the speed change gear according to the present invention.

In FIG. 1 a driving shaft 1 is shown rotating a cylinder body 2 of the pump, containing a plurality of pistons 3. Said pistons bear on the thrust bearing 5 carried by the swash plate 4 which in turn is pivoted on the rotary casing 6. The members 7 control the tilting of the plate 4. Said members will be described in detail later on.

The casing 6 of the pump is rigid with the shaft 8 which by means of the slidable sleeve 9 can be connected to the gear 10 or to the hollow shaft 11 which is the driven shaft of the speed change gear.

If the sleeve 9 is engaged with the gear 10, the drive from the shaft 8 to the driven shaft 11 will occur by means of the gears 12, 13 and 14.

To the driven shaft 11 of the speed change gear are also connected by means of the gears 13–14 and 15–16 respectively, two hydraulic motors comprising the cylinder bodies 17/1 and 17/2 (carried by the two hollow shafts 18/1 and 18/2) and containing the pistons 19/1 and 19/2. Said pistons rest by means of the bearings 20/1 and 20/2 onto the respective swash plates 21/1 and 21/2 in turn pivoted on the outer stationary casing 22 of the speed change gear.

The two hydraulic motors are connected in closed circuit to the pump by the delivery ducts 23/1 and 23/2 of the pump and the suction ducts 24/1 and 24/2 of the pump.

Suitable jacks 25/1 and 25/2 control the titling of the plates 21/1 and 21/2 of said hydraulic motors in order to change the displacement thereof.

Figure 2:
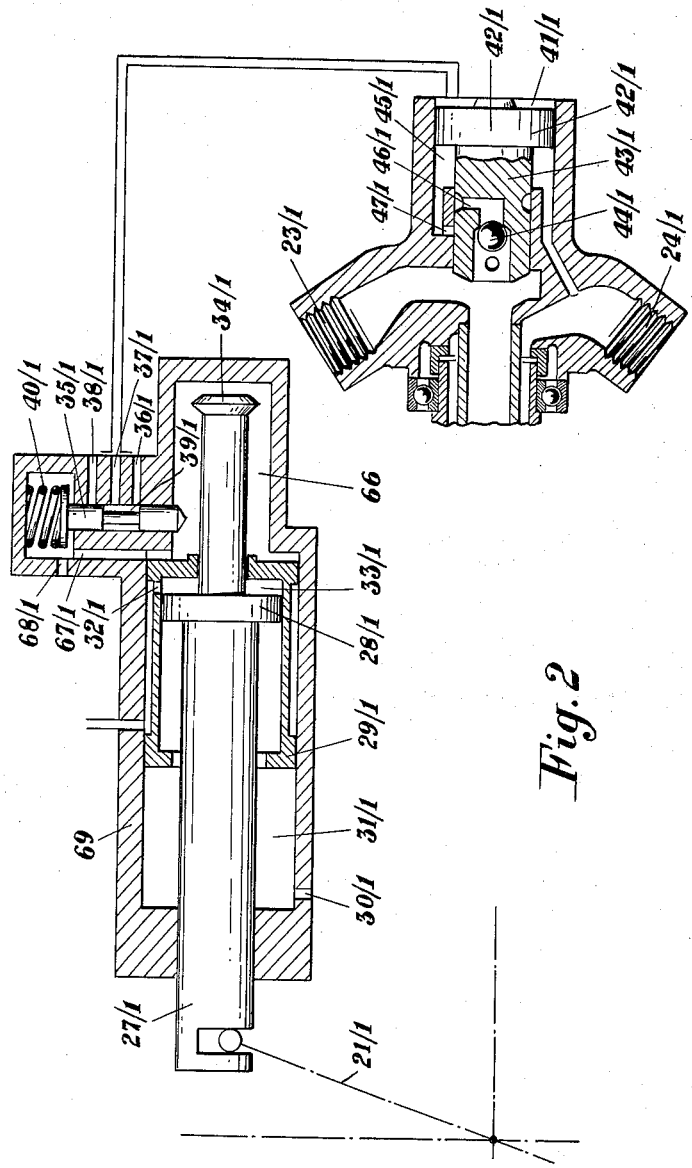
FIGURE 2 is a detail view of the control unit of the swash plates of the hydraulic motors.

FIG. 2 shows the detail of the control of said plates and of the automatic valve blocking the pressure in the ducts 26/1 and 26/2. This device which in the drawing has been shown for a single motor is to be considered repeated for all the hydraulic motors composing the speed change gear.

In said figure it has been shown that the plate 21/1 is connected to the stem 27/1 of the piston 28/1 received within the cylinder 29/1. The diameter of the stem 27/1 associated with the motor /1 will be smaller than that of the stem 27/2 associated with the motor /2. Through the bore 30/1 the chamber 31/1 will be always connected to the operating pressure, either when the engine is in its active condition and when the engine is in braking condition, while the chamber 33/1 will be either connected to the exhuast or placed under pressure by the outer control of the ratos, through the bore 32/1.

The collar 34/1 is fixed to the jack piston and said collar when the piston is full out (i.e. when the motor has zero displacement) and acts on the valve 35/1 for moving outwards said valve and overcoming the action of the spring 40/1. When the valve is full in, as shown in the figure, the chamber 39/1 will connect to the exhaust through the bore 36/1, the duct 37/1, while when the valve is full out it will connect the duct 37/1 to the pressure either when the main engine is in its active condition and when said motor is in braking condition, through the bore 38/1.

The duct 37/1 will deliver the oil thus distributed into the chamber 41/1 wherein is received the piston 42/1 provided with the stem 43/1. When said piston moves forwardly, it will shut off the communication from the chamber 26/1 of the hydraulic motor to the duct 23/1 wherefrom comes the oil from the pump.

Inside the stem of the piston 43/1 there is received a ball valve 44/1 to which the oil can be supplied from the chamber 45/1 only if the stem 43/1 has been moved forwards to the shut off direction, as only in this condition is the bore 46/1 in register with the bore 47/1.

The chamber 45/1 is always connected to the suction ducts 24/1 of the pump.

FIG. 3 shows the control unit for the plate 4 of the pump, said plate being pivoted on the rotary casing 6.

In said figure, the plate 4 is controlled in its tilting movement by the two pistons 48 and 49. The chamber 50 of the piston 49 is always connected to the pressure circuit of the speed change gear for tractive engine and therefore the piston, under the tractive conditions of the engine will always push the swash plate in the direction towards the plane perpendicular to the axis of rotation.

The oil will be delivered into the chamber 51 of the piston 48, or removed therefrom through the groove 52 and the bores 53 by means of the distributor 54. When the distributor is moved towards the right, the oil from the duct 55 (which also is connected to the pressure circuit of the active operating engine of the speed change gear) through the annular chamber 56, will enter into the chamber 51; when the distributor is moved towards the left, the oil of the chamber 51 will be exhausted through the chamber 57.

The control of the distributor 54 is carried out by means of the connecting rod 58, which is operated by the lever 59 so as to reduce the control stress.

The lever 59 in turn is controlled by the piston 60 received within the chamber 61, in connection with the pressure chamber of the braking engine i.e. the suction chamber of the pump.

A gauged spring 62 causes the piston 60 to tend to enter into the chamber 61. The chamber 63 is always communicating with the exhaust through the bore 64 so that the distributor 54 will be submitted to no other stress than the control action of the connecting rod 58.

FIGURE 4 shows a modified detail of FIG. 1 according to which between the two gear wheels 10 and 12 an intermediate gear 65 may be inserted, so that when the sleeve 9 is engaged with the gear 10, the reaction torque deriving from the casing 6 of the pump will be transmitted to a reversed direction to the driven shaft 11 of the speed change gear and thus said torque will be available in contrary direction to that available at the driven shaft when the sleeve 9 is engaged directly therewith.

FIG. 2 shows also that also the torque of the hydraulic motor can be reversed by delivering oil into the chamber 66 (through the ducts 67/1 and 68/1) so as to cause the cylinder 29/1 to move forwards until placing the plate 21/1 of the hydraulic motors in a tilted position contrary to the previously tilted position of said plate.

*Operation*

When the shaft 1 and therefore the cylinder body 2 of the pump rotates, if the plate 4 is fully tilted, a pumping effect will be obtained whereby the oil, if also the plates 21/1 and 21/2 of the hydraulic motors are tilted, will be caused to circulate through the ducts 23 and 24 and through the ducts of the motors, rotating thus the speed change gear.

The rotation of the hydraulic motors will be transmitted to the driven shaft 11 by means of the gears 13–14 and 15–16.

Assuming the sleeve 9 engaged with the driven shaft 11, the reaction of the pump on its casing 6 will be transmitted directly to said shaft.

On the contrary, if the sleeve 9 is engaged with the gear 10, the reaction torque of the pump will be transmitted to the shaft 11 increased by the ratio corresponding to said gears.

According to the tilting position of the plates 21/1 and 21/2 of the hydraulic motors this will change the amount of oil that said motors will be able to receive from the pump and accordingly will change the sliding movement between the cylinder body 2 and the casing 6 of the pump and finally will change the drive ratio between the input shaft 1 and the driven shaft 11. The output torque of the speed change gear will change in direct ratio, as the greater will be the displacement of the motors, the higher will be the drive ratio, and the higher will be the increase of the torque due to the power which the hydraulic motors will recover from the sliding of the pump. Of course, when the hydraulic motors will have zero displacement no power recovery by them will be obtained, no sliding of the pump will occur and on the shaft 11 only the reaction torque of the pump will be available, and in this case the pump will operate as a hydrostatic coupling.

The formula for obtaining the drive ratio of the input shaft 1 with respect to the driven shaft 11 is as follows:

$$R = \frac{(Cm1 \times r1) + (Cm2 \times r2)}{Cp} + rp$$

where R is the drive ratio between the input shaft and driven shaft $$\frac{\text{(revolutions shaft 1)}}{\text{(revolutions shaft 11)}}$$

$Cm1$ and $Cm2$ are the displacements of the motors /1 and /2 respectively. $r1$ and $r2$ are the drive ratios between the motors and the driven shaft.

$$r1 = \frac{\text{Revolution gear 15}}{\text{Revolutions gear 16}}; \quad r2 = \frac{\text{Revolutions gear 13}}{\text{Revolutions gear 14}}$$

$Cp$ is the displacement of the pump
$rp$ the drive ratio between the pump casing and the driven shaft $$rp = \frac{\text{Revolutions gear 10}}{\text{Revolutions gear 12}} \times \frac{\text{Revolutions gear 13}}{\text{Revolutions gear 14}} \text{ or } = 1$$

From the analysis of this formula it appears that when the displacement of the hydraulic motors is zero, the ratio R will be 1 if the sleeve 9 is engaged with the shaft 11, while said ratio will be $rp$ if said sleeve is engaged with the gear 10. This because the first term of the formula will be zero when $Cm1$ and $Cm2$ are equal to zero.

Obviously, while the ratio $rp$ influences by its total amount the maximum speeds of the vehicle, its influence will be rather limited when, being the motors at their maximum displacement, it sums to a rather great number (in the case of run at maximum ratio and therefore at the minimum speed of the vehicle).

The ratios $r1$ and $r2$ of the hydraulic motors do not influence the maximum speed as the whole term will be equal to zero, but on the minimum speed and accordingly said ratios must be as high as possible compatibly with the possibility of maximum rotation of said motors.

As shown in FIG. 1 the motor /1 is coupled to the shaft 11 by the gears 15 and 16 the diameters of which are almost equal, while the motor /2 is coupled with a great step down gearing to the gears 13 and 14.

Further as disclosed by FIG. 2 and the preceding specification, the control of the change of displacement of the two hydraulic motors does not occur simultaneously, but the two jacks control one after another as the stems 27/1 and 27/2 have different diameters. Starting from the maximum ratio (motors at their maximum displacement) first will be excluded the motor /2 i.e. the most stepped up motor and then the motor /1 i.e. the motor the ratio of which is almost 1. Due to the presence in the circuit of the valves 43/1 and 43/2 which shut off the pressure to the respective motor when the latter reaches zero displacement, when the motor /2 has reached the zero displacement automatically it will be excluded from the pressure circuit so that the whole range of the ratios comprised between that corresponding to the exclusion of the motor /2 and the ratio 1 will be obtained at a higher efficiency and the motor /2 will be stepped up with no risk of damage as the pressure thereto will be removed when the shaft 11 is still far from its maxiimum number of revolutions.

To secure the operation towards the ratio 1 and also the displacement zero for the motor /1. Also in this case the valve 43/1 will shut off the pressure towards said motor so that when both motors have zero displacement they have not to be driven under pressure by the pump reaction which under these conditions operates as a hydrostatic coupling. This will ensure a great advantage in the efficiency and a large diminution in the wear of the motors, particularly if the speed change gear is mounted on vehicles which have to run on roads.

Both the shut off operation and the aperture of the valves 43/1 and 43/2 occur automatically controlled by the distributor 45/1 and 45/2 respectively.

However, as this control for obvious constructive reasons will not occur when the displacement of the motor is absolutely zero, the ball valve 44 is provided which, when the piston 43 is advanced to its shut off position, through the duct 47-46 allows the hydraulic motor to intake the oil from the chamber 45 which is in turn connected to the suction duct 24 of the speed change gear. Causing all the constructive errors to affect the unit so that the zero displacement in the motors will never be attained (avoiding thus that the said displacement will become negative) as soon as the valve 43 in the last portion of its stroke will carry out its shut off action, the diminution of the pressure within the chamber 26 will cause the valve 44 to open and an oil circuit will be thus established between the motor (having a very little displacement) and the suction circuit of the speed change gear.

Thus the oil inlet and outlet chambers of the motor will be short-circuited and connected to the suction circuit of the pump, where there is the pressure of the small supplementary pump (a low pressure pump) which serves the purpose of avoiding air bubbles in the circuits and of forcedly obtaining the return stroke of the pistons.

When the valve is open, the bores 47 and 46, which are out of register, will prevent the oil from passing through the ducts 24 towards the ducts 26 when, in order to exploit the braking effect of the main engine, the pressure from the ducts 23 to the ducts 24 is caused to reverse, and this occurs at all times when, with the vehicle full running, the driver releases the accelerator pedal.

The main feature of the constructive embodiment of the speed change gear according to this invention is that of offering the possibility of adopting a plurality of hydraulic motors obtaining thus a total large displacement for the motors without adopting large size motors (it will be convenient, generally, to adopt the size of the pump, in order to be in position of utilizing the particular elements thereof) and of multiplying said motors with respect to the driven shaft so as to obtain a ratio as high as possible for the speeds and accordingly the greatest possible increase of the torque.

Obviously, all ratios obtainable by the change of displacement of the motors at parity of input torque, will be obtained at constant pressure.

In order to obtain a further increase of torque, particularly for occasional service or emergency service (for instance in case of great effort on slopes, with trucks with full loaded trails which obviously will have a short extent) the diminution of the pump displacement will be adopted so as to obtain the desired increase of the torque with an increase of pressure.

The change of the displacement of the pump occurs as hereinbefore disclosed and as shown in FIGURE 3 by means of the pistons 48 and 49 which act directly onto the swash plate 4 of the pump.

Said change is controlled as follows:

The operating pressure, when the engine is tractive, reaches the chamber of the piston 49 which acts on the plate 4 in direction to reduce the displacement of the pump. From the opposite side the piston 48 (having a diameter greater than that of the piston 49) will be submitted to the full pressure, or it will be connected to the exhaust so as to overcome or be overcome by the action of the piston 49.

The control of the pressure within the chamber 51 is obtained by means of the supplementary piston 60, received within a chamber 61 which is directly connected to the circuit 24 of the speed change gear, with an intake inside the rotary casing of the pump. In said circuit, as aforesaid, when the main engine is tractive, there is the low pressure of the filling pump the supply of which is obtained by means of known valves, in the nonrotary portion of the circuit.

Also by means of known devices the pressure of said filling pump is caused to change through a small extent, between two well defined values.

The pistons 60 which is urged back into its seat by the spring 62, will be effected by this very small change of pressure and through the lever 59 and the connecting rod 58 will control the distributor 54 so that when the low pressure within the chamber 61 will increase, the distributor 54 will deliver the pressure to the chamber 51 and vice-versa when the pressure at 61 will diminish, the chamber 51 will be connected to the exhaust.

The device forms therefore a repeater servo-control provided with a great sensitivity as the lever 59 reduces to the utmost the lack of sensitivity deriving from the unavoidable frictions of the distributor 54.

If, the accelerator will be released by the driver and the main engine will become a braking engine, within the chamber 61 there will be obtained the full braking pressure, while within the chamber 50 the low pressure of the filling pump will be obtained. The piston 60 which was before acting as a repeater, in this case will bear onto the plate 4 constraining it to tilt.

Finally, if the driver has pre-disposed as tractive condition a reduced ratio by the operation of the pump, said ratio will automatically reach that corresponding to the maximum displacement of the pump all times when the braking condition by the main engine will occur. This avoids the possibility of braking with too high ratios, with a shut pump (which under these conditions must act as a motor in order to rotate the main engine), as in said ratios the drive would be no more possible and which accordingly would be dangerous for practical use.

By the aforedescribed device the driver, acting on the known devices capable of changing the filling pressure of the speed change gear, will cause the change of the displacement of the pump located inside the rotary casing and this with no mechanical connections or supplementary oil rotary intakes, but using the rotary intakes of the main circuit of the speed change gear.

All the considerations hereinbefore disclosed are true when the sleeve 9 (FIG. 1) is directly engaged with the driven shaft 11 and when said sleeve is engaged with the gear 10. In this case a maximum speed reduction will be obtained for the ratio rp and accordingly the torque obtained by the pump reaction will be increased by the mechanical drive and accordingly (with the efficiency of the gears higher than that of the hydraulic drive) an improvement will be obtained in the total efficiency whereby if a long run of the vehicle in low ratios is to be expected, it will be convenient to engage the sleeve 9 with the gear 10.

In the concerned type of speed change gear, in order to obtain the reverse motion it will be sufficient to reverse the torque of the hydraulic motors as the latter having a possibility of torque far greater than that deriving from the reaction of the pump, the resulting torque will be sufficient for the vehicles.

A system which can be adopted to reverse the torque of the hydraulic motors is that of reversing the tilting of the plates 21/1 and 21/2 of said motors and this effect as disclosed can be obtained by delivering oil under pressure to the chambers 66/1 and 66/2 of the control hydraulic jacks.

This reverse motion condition cannot be accepted, however when the vehicle as for instance in railroad applications which must have both directions of motion for normal working conditions.

In this case as shown in FIG. 4 the gear group of FIG. 1 will be slightly modified so that between the two gears 10 and 12 (which were in the previous embodiment in mesh with one another) there is inserted the gear 65. By this addition, when the sleeve 9 is in mesh with the gear 10, the reaction torque of the pump will reach the driven shaft 11 in reversed direction so that if the operation of the sleeve 9 is coupled to that of the chamber 66 both the torques, the reaction torque of the pump and the torque of the hydraulic motors will be reversed, whereby there will be obtained again in reverse the conditions of the sum of the torques and therefore of efficiency for forward speeds.

The present invention has been illustrated and described in a preferred embodiment, it being however understood that constructive changes may be practically adopted without departing from the present invention.

I claim:

1. A continuous hydraulic speed change gear with a gear casing, an input shaft and a hollow output shaft arranged coaxially to one another, an oil pressure duct and an oil exhaust duct, comprising in combination a multi-cylinder hydraulic pump having a rotary casing, a pump shaft rotatably supported at one end within said hollow output shaft and at the other end on said input shaft, said casing and said shaft being rigidly connected with one another, a pump cylinder body rigidly secured to said input shaft, a plurality of pump pistons arranged within said cylinder body, a pump swash plate pivotally connected with said rotary pump casing and contacting the outer ends of said pump pistons around said input shaft, hydraulic control means for controlling the tilting of said pump swash plate, at least two hydraulic motors arranged in said gear casing around said pump shaft and hydraulically connected in closed circuit with said pump, mechanical gearing means coupling said hydraulic motors with said output shaft, said hydraulic motors each comprising a pivot shaft rotatably supported in said gear casing, a motor cylinder block rigidly supported on said pivot shaft, a plurality of pistons arranged within said motor cylinder block, a motor swash plate contacting the outer ends of said motor pistons and pivoted to said gear casing, differential piston means controlling the tilting of said motor swash plate and a gearing sleeve slidably keyed on said pump shaft and couplable with said output shaft and with said mechanical gearing means, whereby two speed ranges may be obtained, the first one comprising the hydraulic drive with said gearing sleeve coupling said pump shaft to said output shaft and the second one comprising the hydraulical drive and mechanical drive through said mechanical gearing means.

2. A continuous hydraulic speed change gear as claimed in claim 1, wherein said hydraulic control means for controlling the tilting of said pump swash plate comprises a first cylinder rigidly connected with said pump casing, a first piston within said first cylinder steadily under oil pressure, the outer end of said first piston protruding from said first cylinder for urging said pump swash plate towards a position perpendicular to the longitudinal axis of said first piston, a second cylinder opposite said first cylinder and rigidly connected with said pump casing, a second piston within said second cylinder, the outer end of said second piston contacting said swash plate, said second piston having a longitudinal groove, two control bores opening into said groove and a pressure bore steadily connected with the oil pressure duct, a distributor slidably arranged in a central axial recess of said second piston and having a central axial bore and an annular oil pressure recess, an annular cylinder parallel to said second cylinder and connected with the suction side of said pump, a hollow piston slidably arranged in said annular cylinder, a return spring arranged within said hollow piston causing said hollow piston to enter into said annular cylinder, a lever connecting said hollow piston with said second piston, a rod arranged within said axial recess of said second piston and connecting said lever with said distributor, whereby upon changing the pressure in said annular cylinder said hollow piston controls through said distributor, annular oil pressure recess and control bores the displacement of said second piston and thus the tilting of said pump swash plate.

3. A continuous hydraulic speed change gear as claimed in claim 1, wherein said differential piston means comprise each an outer casing having a first chamber and a second chamber, a cylinder arranged between said first and second chamber and having an annular recess on its outer face, a piston slidably arranged in said cylinder and having a first stem passing freely through said cylinder and sealingly through said casing, the outer end of said first stem being pivotally connected with said motor swash plate, and a second stem projecting through said cylinder into said second chamber and having a collar at its end, a spring valve arranged in a projection of said outer casing perpendicular to the longitudinal axis of said outer casing and projecting into said second chamber, a ball valve for shutting off the hydraulic motor at zero displacement thereof, said first chamber having a bore connected to the oil pressure duct, said cylinder having a bore opening into said annular recess and connectable through a bore in said casing with the oil pressure duct and with the exhaust duct, said third chamber being connectable with said oil pressure duct and exhaust duct through a channel and a bore provided in said casing projection, said casing projection having three parallel bores connected respectively with said pressure duct, exhaust duct and ball valve means, said spring valve having an annular connecting recess for connecting said ball valve means with said pressure duct, whereby when the first stem moves the motor swash plate to zero displacement position of the hydraulic motor said collar of the second piston stem raises said spring valve for disconnecting through said valve annular recess said exhaust duct from said ball valve means and for connecting the last with said pressure duct to shut off the hydraulic motor, the first stems of the differential piston means having a different diameter for attaining a subsequent shutting off of both motors.

References Cited by the Examiner
UNITED STATES PATENTS

| | | | |
|---|---|---|---|
| 105,986 | 8/70 | Selden | 121—157 |
| 2,642,045 | 6/53 | Potts | 121—157 |
| 2,769,393 | 11/56 | Cardillo et al. | |
| 2,845,876 | 8/58 | Keel. | |
| 2,854,820 | 10/58 | Bousquet | 60—53 |
| 2,891,419 | 6/59 | Badalini | 74—687 |
| 2,907,230 | 10/59 | Kollmann | 74—687 |
| 2,941,480 | 6/60 | Sadler et al. | 103—162 |
| 3,074,296 | 1/63 | Ebert | 74—687 |

FOREIGN PATENTS

| | | |
|---|---|---|
| 538,803 | 3/57 | Canada. |

DON A. WAITE, *Primary Examiner.*